(12) United States Patent
Palanki et al.

(10) Patent No.: US 8,787,989 B2
(45) Date of Patent: Jul. 22, 2014

(54) EFFICIENT SLEEP MODE OPERATION FOR OFDMA SYSTEMS

(75) Inventors: Ravi Palanki, San Diego, CA (US); Jeremy H. Lin, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 698 days.

(21) Appl. No.: 12/032,467

(22) Filed: Feb. 15, 2008

(65) Prior Publication Data

US 2009/0209272 A1 Aug. 20, 2009

(51) Int. Cl.
 *H04B 1/38* (2006.01)
(52) U.S. Cl.
 USPC .......................................... 455/574; 370/311
(58) Field of Classification Search
 USPC ............ 455/574, 21, 42, 115.3, 127.5, 127.1, 455/134; 370/311, 318, 350, 503
 See application file for complete search history.

(56) References Cited

U.S. PATENT DOCUMENTS

| | | | | |
|---|---|---|---|---|
| 6,101,176 A * | 8/2000 | Honkasalo et al. | ............ | 370/335 |
| 6,138,034 A | 10/2000 | Willey | | |
| 6,438,376 B1 | 8/2002 | Elliott et al. | | |
| 6,577,608 B1 * | 6/2003 | Moon et al. | .................... | 370/311 |
| 7,711,377 B2 | 5/2010 | Laroia et al. | | |
| 2003/0008691 A1 * | 1/2003 | Chen et al. | ..................... | 455/574 |
| 2005/0063331 A1 | 3/2005 | Kim et al. | | |
| 2005/0266844 A1 * | 12/2005 | Narasimha | ................. | 455/435.2 |
| 2005/0277429 A1 * | 12/2005 | Laroia et al. | ................... | 455/458 |
| 2006/0285485 A1 | 12/2006 | Agrawal et al. | | |
| 2007/0087698 A1 * | 4/2007 | Lee | ................................. | 455/69 |
| 2007/0165667 A1 | 7/2007 | Kadaba et al. | | |
| 2007/0206524 A1 * | 9/2007 | Suk | ............................... | 370/320 |
| 2007/0286066 A1 | 12/2007 | Zhang et al. | | |
| 2008/0081613 A1 * | 4/2008 | Yang et al. | ................. | 455/426.1 |
| 2008/0084941 A1 * | 4/2008 | Mohanty et al. | ............. | 375/260 |

FOREIGN PATENT DOCUMENTS

| | | |
|---|---|---|
| CN | 1344071 A | 4/2002 |
| DE | 3133347 A1 | 3/1983 |
| EP | 0655872 A2 | 5/1995 |
| JP | 2008505591 A | 2/2008 |
| JP | 2009544244 A | 12/2009 |
| RU | 2149518 | 5/2000 |
| RU | 2189113 C2 | 9/2002 |
| WO | 2005125234 | 12/2005 |
| WO | 2008008984 A2 | 1/2008 |

OTHER PUBLICATIONS

International Search Report and Written Opinion—PCT/US2009/034125, International Search Authority—European Patent Office—Mar. 25, 2009.
European Search Report—EP08153631—Search Authority—The Munich—Jul. 9, 2008.
Taiwan Search Report—TW098104904—TIPO—Mar. 13, 2012.
Taiwan Search Report—TW098104904—TIPO—Feb. 12, 2012.
Taiwan Search Report—TW098104904—TIPO—Sep. 13, 2013.

* cited by examiner

*Primary Examiner* — Ajit Patel
(74) *Attorney, Agent, or Firm* — Donald C. Kordich

(57) ABSTRACT

A communications system and method for a wireless mobile device is provided. The method includes performing sleep mode operations in a device and performing wake-up operations with one or more base stations in view of the sleep mode operations in the device. The method also includes demodulating a communications channel for the device during sleep mode operations in the device and prior to synchronizing with the base stations.

38 Claims, 13 Drawing Sheets

EFFICIENT SLEEP MODE OPERATION FOR OFDMA SYSTEMS

BACKGROUND

I. Field

The following description relates generally to communications systems, and more particularly to power conservation components that facilitate efficient sleep mode operations in an access terminal.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing, (OFDM), and others.

Orthogonal Frequency Division Multiple Access (OFDMA) is a multi-user version of the popular OFDM digital modulation scheme. Multiple access is achieved in OFDMA systems by assigning subsets of sub-carriers to individual users. This allows concurrent low data rate transmission from several users. Based on feedback information regarding channel conditions, adaptive user-to-sub-carrier assignment can be achieved. If the assignment is performed sufficiently fast, this further improves the OFDM robustness to fast fading and narrow-band co-channel interference, and allows it to achieve even better system spectral efficiency.

A different number of sub-carriers can be assigned to different users, in view to support differentiated Quality of Service (QoS) i.e., to control the data rate and error probability individually for each user. Thus, OFDMA resembles code division multiple access (CDMA) spread spectrum, where users can achieve different data rates by assigning a different code spreading factor or a different number of spreading codes to each user.

OFDMA can also be seen as an alternative to combining OFDM with time division multiple access (TDMA) or time-domain statistical multiplexing i.e., packet mode communication. Low data rate users can send continuously with low transmission power instead of using a "pulsed" high-power carrier. Constant delay, and shorter delay, can also be achieved. However, OFDMA can also be described as a combination of frequency domain and time domain multiple access, where resources are partitioned in the time-frequency space, and slots are assigned along an OFDM symbol index as well as OFDM sub-carrier index.

In addition to the wireless access techniques such as OFDMA, common wireless communication systems employ one or more base stations that provide a coverage area. A typical base station can transmit multiple data streams for broadcast, multicast and/or uni-cast services, where a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

One always present issue for the mobile devices is the ability to conserve power. Such devices generally operate on battery power and the ability to conserve power provides great utility for users of the devices. With respect to OFDMA devices, these often operate in bursts referred to as sleep mode operation where power is conserved and wake-up operation where the device communicates with a respective base station. Thus, by minimizing wake-up time, power can be conserved and battery life can be increased.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Efficient communication systems and protocols are provided where demodulation operations between wireless terminals and base stations are performed without first performing chip-level synchronizations as with conventional systems. In order to conserve battery power and increase standby time, an access terminal (AT) has a sleep mode operation in which it receives signals from a base station for a short period of time (referred to as "wake-up time") every few seconds (referred to as "sleep cycle period"). The wake-up time should be made as short as possible in order to conserve battery power. During the wake-up time, the AT typically searches for acquisition pilots (referred to as ACQCH) of a sector, synchronizes to that sector, and then demodulates its paging or quick paging channel (QPCH).

In OFDMA systems, it is possible to demodulate a channel even if the AT does not have chip-level synchronization. This is due in part to the robustness of OFDMA systems to multipath. Thus, due to this robustness, a system and protocol is provided where the AT first attempts demodulating the QPCH during sleep mode operations without first synchronizing to the ACQCH. The AT can use the strongest sector in the previous wake-up slot (or some other sector it deems appropriate) to demodulate the QPCH. Acquisition can be achieved in parallel or after QPCH demodulation, for example. If the QPCH demodulation using a first sector fails, the AT may attempt demodulation using a strong sector observed via acquisition. If this attempt also fails, the AT may attempt decoding using a third sector seen via acquisition and so forth until suitable demodulation is achieved.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate power conservation in wireless mobile devices. In an aspect, a communications method for a wireless mobile device is provided. The method includes performing sleep mode operations in a device and performing wake-up operations with one or more base stations in view of the sleep mode operations in the device. The method also includes demodulating a communications channel for the device during sleep mode operations in the device and prior to synchronizing with the base stations. By demodulating prior to synchronization, wake-up operations in the device are mitigated thereby conserving device power.

Furthermore, various aspects are described herein in connection with a terminal. A terminal can also be called a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Figure 1:
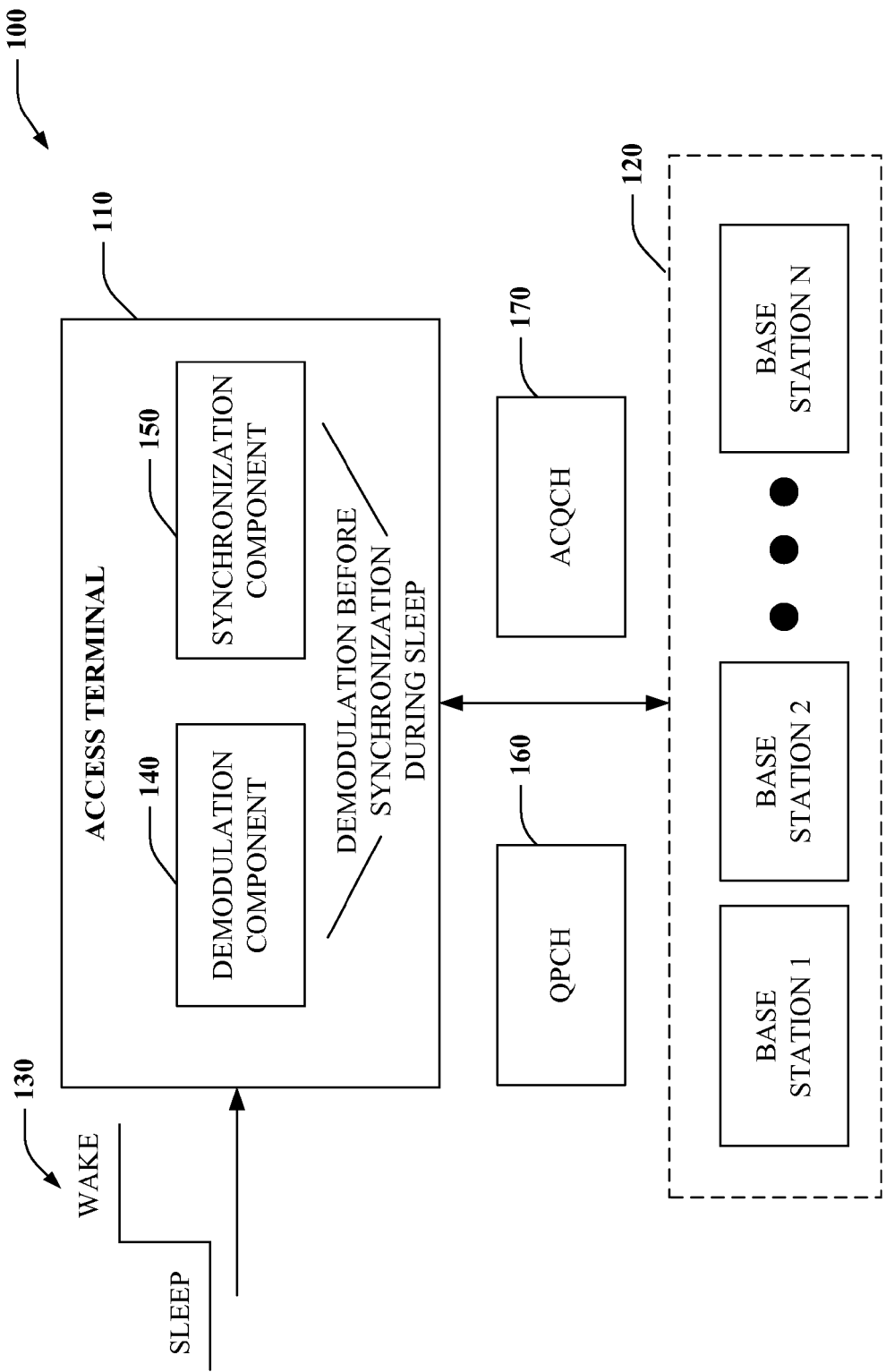
FIG. 1 is a high level block diagram of a system that is provided to illustrate efficient sleep mode operations in a communications environment.

Referring now to FIG. 1, a system 100 illustrates efficient sleep mode operations in a communications environment. The system includes an access terminal 110 that communicates with one or more base stations 120. As shown, a signal 130 is provided to alternatively cause the access terminal 110 to become active for wake mode operations of the terminal or to switch to sleep mode operations. Although the sleep/wake signal 130 is shown as an external signal, it is to be appreciated that such signal can be generated internally within the access terminal 110.

Sleep mode is a mode where functionality (hardware and/or software) of the access terminal 110 is limited or restricted in operation in order to conserve power in the terminal. A demodulation component 140 and a synchronization component 150 are provided to facilitate communications with the base stations 120. In general, demodulation operations are performed prior to or in parallel to synchronization operations in order to allow the access terminal 110 to remain in sleep mode operation for longer periods of time and thus conserving battery power. One or more quick page channel (QPCH) 160 and acquisition pilot (ACQCH) signals 170 are exchanged between the access terminal 110 and the base stations 120 to facilitate efficient sleep mode operations as will be described in more detail below.

In general, demodulation operations between the access terminal 110 and the base stations 120 are performed without first performing chip-level synchronizations at the access terminal as with conventional systems. In order to conserve battery power and increase standby time, the access terminal 110 has a sleep mode operation in which it receives signals 130 from the base station or stations 120 for a short period of time (referred to as "wake-up time") every few seconds (referred to as "sleep cycle period"). The wake-up time should be made as short as possible in order to conserve battery power. During the wake-up time, the access terminal 110 typically searches for acquisition pilots 170 (referred to as ACQCH) of a sector, synchronizes to that sector, and then demodulates its paging or quick paging channel (QPCH) 160.

In OFDMA systems, it is possible to demodulate a channel even if the access terminal 110 does not have chip-level synchronization. This is due in part to the robustness of OFDMA systems to multi-path. Thus, due to this robustness, a system and protocol is provided where the access terminal 110 first attempts demodulating the QPCH 160 during sleep mode operations without first synchronizing to the ACQCH 170. The access terminal 110 can use the strongest sector in the previous wake-up slot (or some other sector it deems appropriate, e.g., signal quality, signal strength, policy considerations) to demodulate the QPCH 160. Acquisition can be achieved in parallel or after QPCH demodulation, for example. If the QPCH demodulation using a first sector fails, the access terminal 110 can attempt demodulation using a strong sector observed via acquisition. If this attempt also fails, the access terminal 110 can attempt decoding using a third sector observed via acquisition and so forth until suitable demodulation is achieved. Substantially any protocol that allows QCPH demodulation prior to or in parallel to chip level synchronization is considered within the scope of the subject innovation. In another aspect, the QPCH can be demodulated without demodulating ACQCH. For instance, if the AT decodes QPCH, it may potentially go to sleep without decoding ACQCH as it determines the timing is sufficient.

It is noted that the access terminal 110 or mobile device, can be, for instance, a module such as an SD card, a network card, a wireless network card, a computer (including laptops, desktops, personal digital assistants PDAs), mobile phones, smart phones, or any other suitable terminal that can be utilized to access a network. The terminal 110 accesses the network by way of an access component (not shown). In one example, a connection between the terminal 110 and the access components may be wireless in nature, in which access components may be the base station and the mobile device is a wireless terminal. For instance, the terminal 110 and base stations 120 may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g. communication modules, for communicating with other network nodes. Additionally, the access component can be a base station 120 (or wireless access point) in a cellular type network, wherein base stations (or wireless access points) are utilized to provide wireless coverage areas to a plurality of subscribers. Such base stations 120 (or wireless access points) can be arranged to provide contiguous areas of coverage to one or more cellular phones and/or other wireless terminals.

Figure 2:
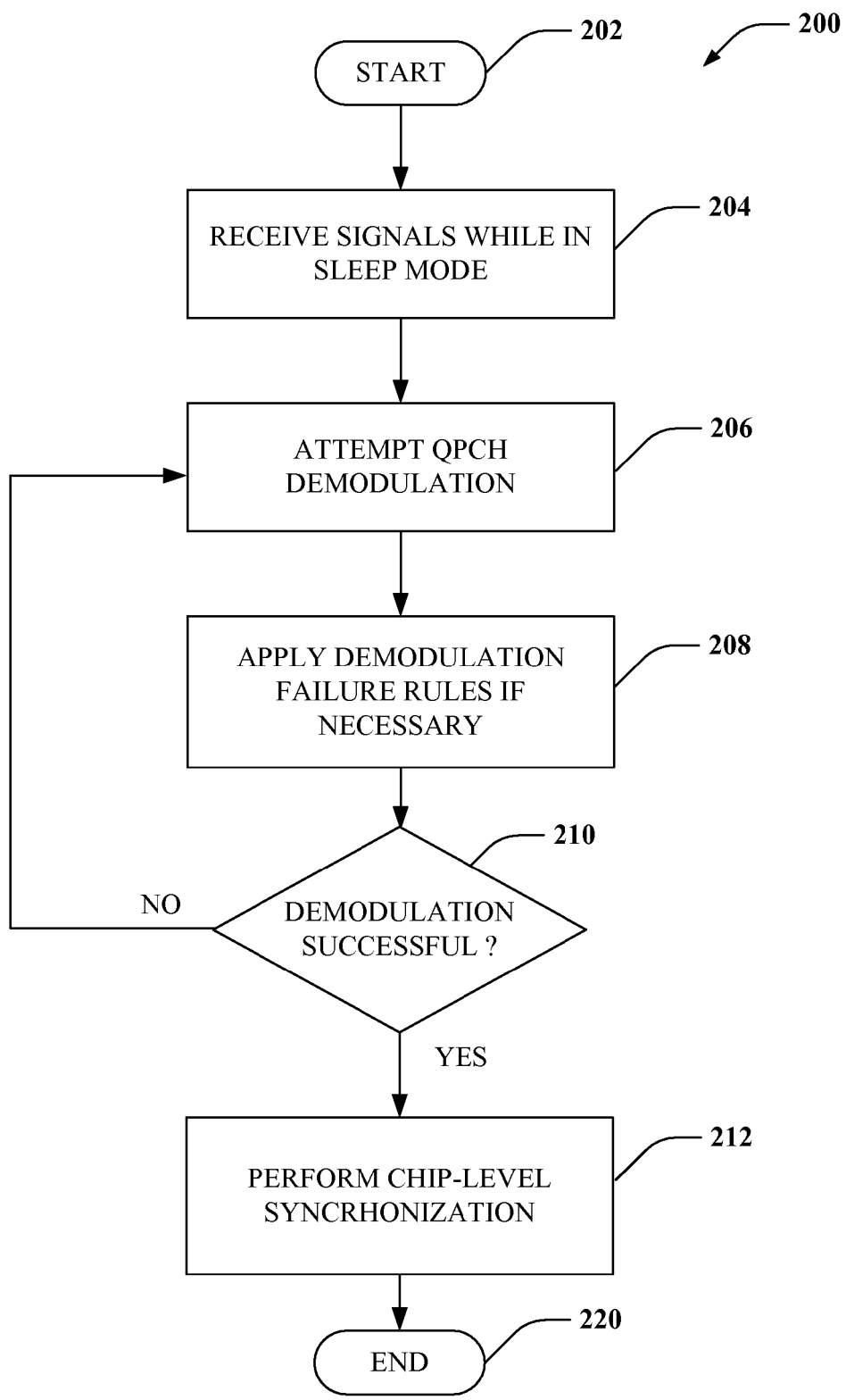
FIG. 2 is a high level flow diagram of a sleep mode demodulation process.

Referring now to FIG. 2, a process 200 illustrates sleep mode operations and demodulation prior to or in parallel with chip synchronization. While, for purposes of simplicity of explanation, the methodology (and other methodologies described herein) is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 202, the process 200 begins. At 204, one or more signals are received by an access terminal. Such signals can include sleep or wake mode indicators, one or more acquisition pilots (referred to as ACQCH), a quick paging channel (QPCH) signal and other signals for communications between the terminal and base station. At 206, the process 200 attempts to demodulate a channel even if the access terminal does not have chip-level synchronization. As noted above, due to the robustness of the system, a protocol is provided where the access terminal first attempts demodulating the QPCH during sleep mode operations without first synchronizing to the ACQCH.

Proceeding to 208, one or more demodulation failure rules can be applied. Thus, the access terminal can use the strongest sector in the previous wake-up slot (or some other sector deemed appropriate) to demodulate the QPCH. As noted previously, acquisition can be achieved in parallel or after QPCH demodulation, for example. If the QPCH demodulation using a first sector fails, the access terminal can attempt demodulation using a strong sector observed via acquisition. If this attempt also fails, the access terminal can attempt decoding using a third sector observed via acquisition and so forth until suitable demodulation is achieved. At 210, a decision is made as to whether or not the previous demodulation attempt or attempts have been successful. If the attempts have not been successful, the process proceeds back to 206 to attempt other demodulations. In another aspect, if demodulation is determined unsuccessful at 210, the process 200 terminates and is revived at a later time by a subsequent process or event. If demodulation is successful at 210, the process proceeds to 212 where chip level synchronization is then performed. After synchronization, the process ends at 220. Before proceeding, it is noted that FIGS. 3-6 illustrate exemplary aspects of the concepts described thus far. It is to be appreciated that the systems and protocols described herein are not limited to such examples.

Figure 3:
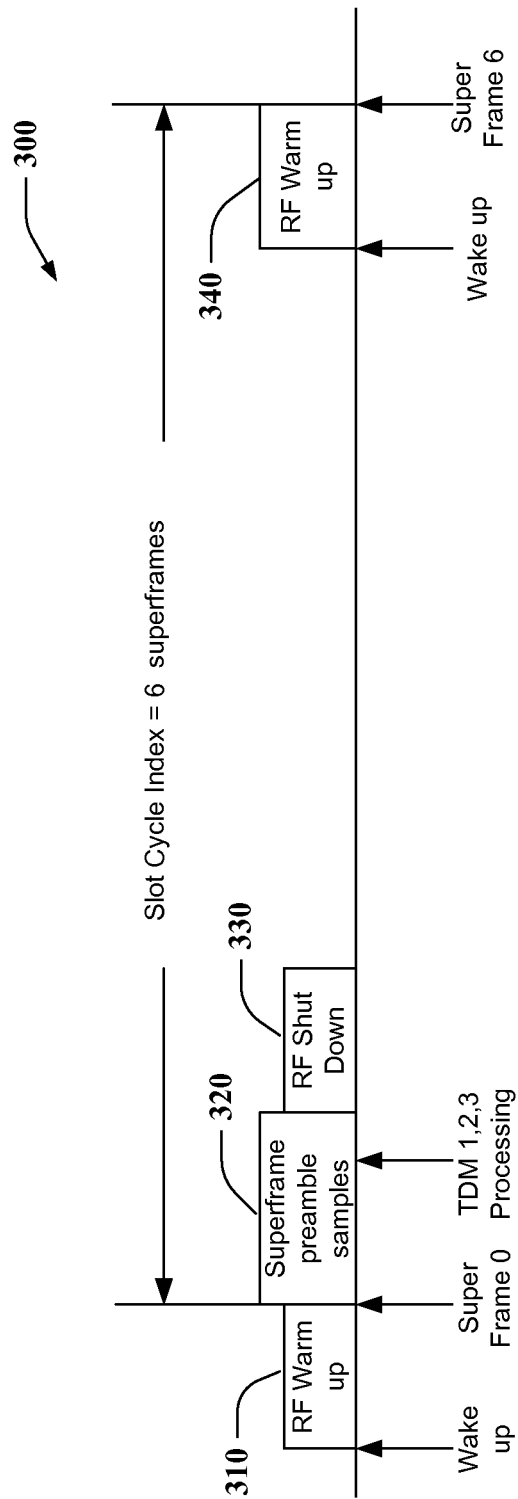
FIG. 3 is a signal diagram that illustrates aspects of wake mode and sleep mode processing.

Now referring to FIG. 3, an example signal diagram 300 illustrates slotted mode operations for sleep mode processing. In general, an access terminal (AT) monitors its pages and if necessary, updates its overhead messages and/or enters system access. In order to be more power efficient, the AT can monitor a control channel in a slotted mode where the diagram 300 shows a slot cycle index that is about six superframes in this example, where superframes provide various synchronization and data packets between the AT and base stations. During slotted mode operation, the AT generally monitors selected superframes and sleeps otherwise. As shown in the diagram 300, a wake up period can include a radio frequency (RF) Warm up 310, a superframe preamble processing period 320, and an RF shut down period 330. At the end of six superframes (or other designated number), a subsequent wake period commences at 340.

Paging operations can include forward quick paging channel (F-QPCH) and forward data channel (F-DCH) processing. The F-QPCH channel generally occurs in OFDM symbols no. 1-4 of the superframe preamble. In even numbered superframes, there is a QuickPage block. If the QuickPage block is transmitted in superframe number 'n' then the full page is transmitted in superframe number 'n+1'. The QuickPaging block may have at least two possible forms:

a) If an access terminal indication (ATI) in a QuickPage block matches a ReceivedATIList of the Address Management Protocol, Superframe Preamble MAC protocol issues a PageReceived indication.

b) If the LSBs of a QuickPageID (it's a derived value and public data of the Idle State Protocol) match one of the QuickPageID fields of the QuickPage block then Superframe Preamble MAC protocol generates a QuickPageReceived indication and the AT then reads its full page in the next superframe. As can be appreciated, other signals and operations can be employed for wireless communications.

Figure 4:
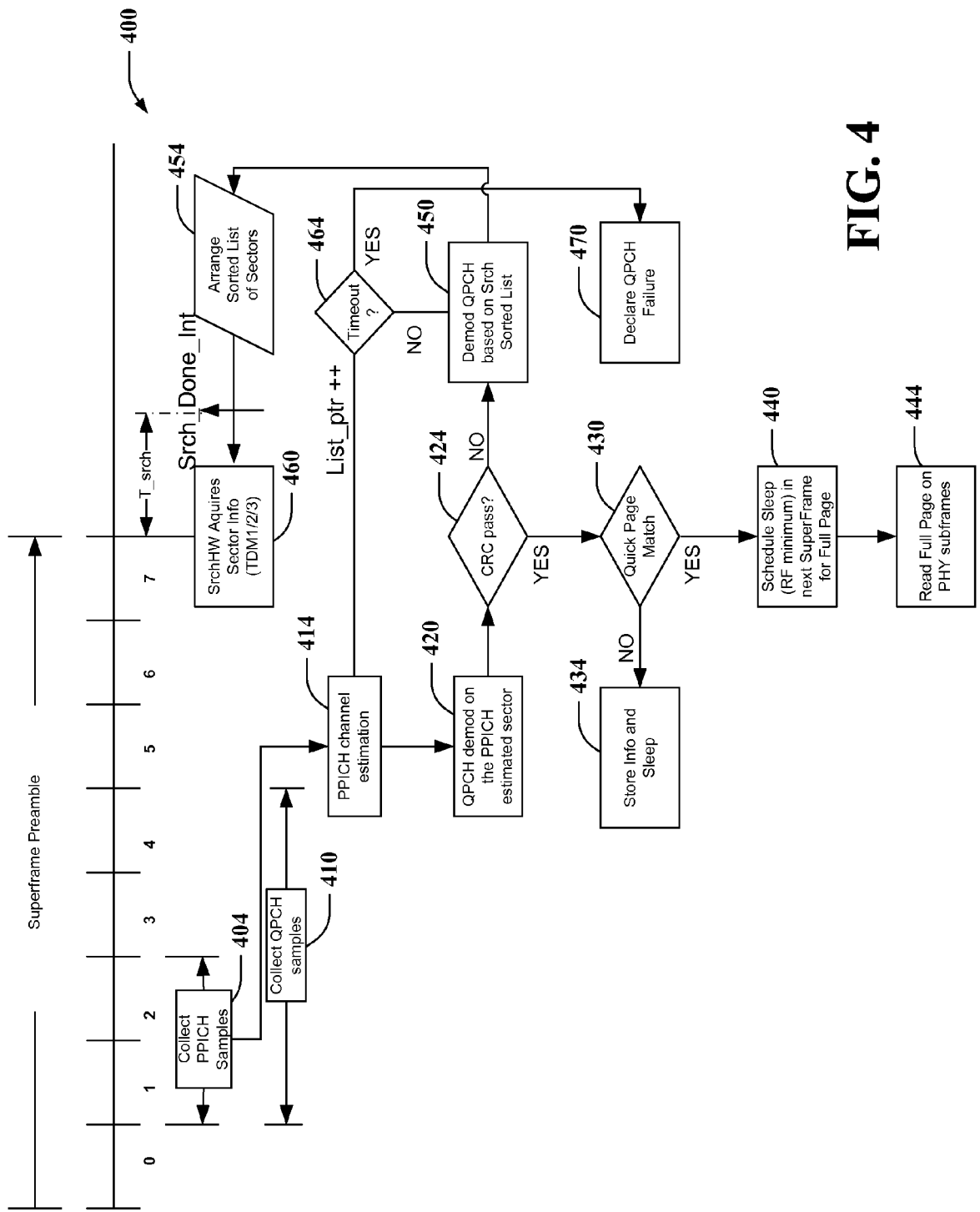
FIG. 4 illustrates a quick paging channel demodulation process.

Turning to FIG. 4, a quick paging channel demodulation process 400 is illustrated. The process 400 is depicted over a superframe preamble. At 404, preamble pilot channel (PPICH) samples are collected and at 410, quick paging channel (QPCH) samples are collected. At 414, PPICH channel estimation is performed and at 420 a QPCH demodulation is performed in view of the PPICH estimated sector from 414.

Proceeding to 424, a cyclic redundancy check (CRC) is performed and a determination is made as to whether or not the CRC passed. If the CRC passes at 424, the process proceeds to 430 for a Quick Page Match determination. If a match is not found, the process stores data and proceeds to sleep mode at 434. If a match is found at 430, the process proceeds to 440 and schedules sleep in the next superframe for a full page. At 444, the process reads a full page on physical subframes.

If the CRC test did not pass at 424 described above, the process proceeds to and performs a demodulation of the QPCH based on a sorted list. The process then proceeds to 454 to arrange a sorted list of sectors and to acquire sector information at 460. It is noted that a timeout test is performed at 464 and receives input from the PPICH channel estimation.

If no timeout occurs, the process proceeds to 450. If there is a timeout at 464, a QPCH failure is declared at 470 and is described in more detail below. In general, the process 400 can be first attempted for the serving sector. The QPCH can be designed to be decodable even at −5~−6 dB geometries. If there is QPCH failure, it may be due to: a) Sudden fade where there is loss in sector energy. b) Overhead parameters have changed. A timeline and flowchart for QPCH decode failure is shown in FIGS. 5 and 6.

Figure 5:
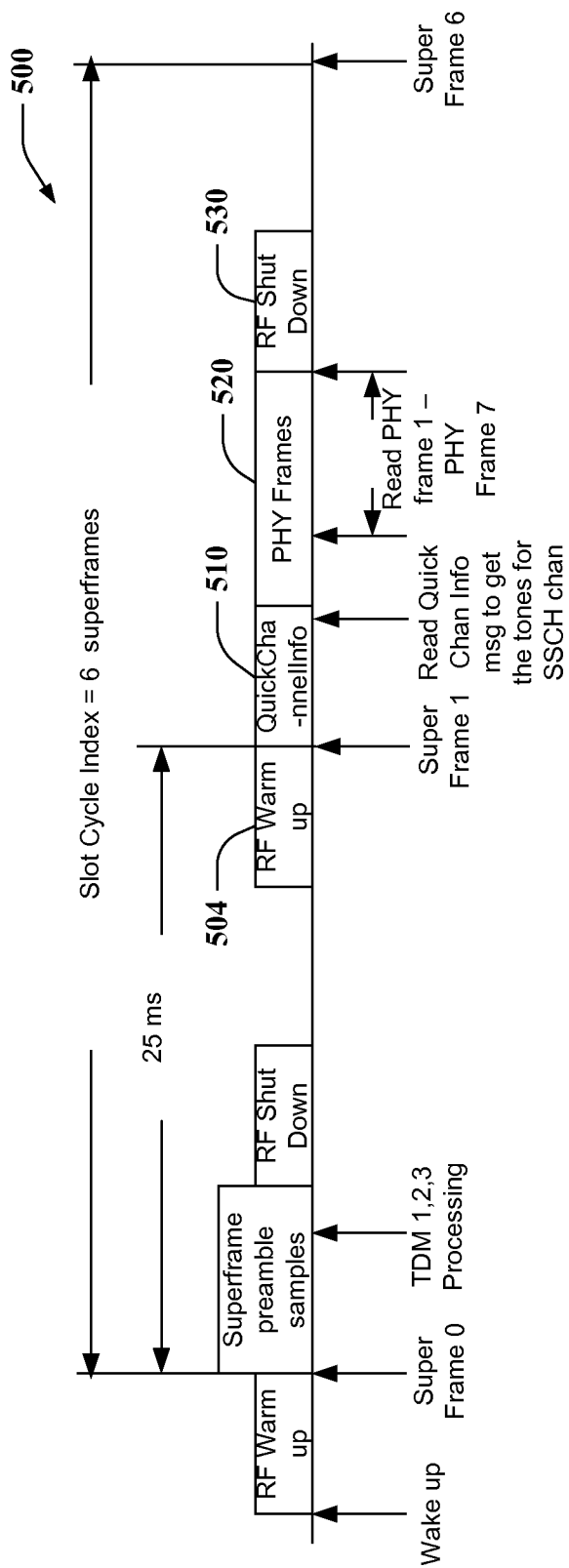
FIG. 5 illustrates a timeline diagram for a QPCH decode failure.

Referring to FIG. 5, a timeline diagram illustrates processing for reading a full page after a QPCH decode failure. As shown, after an RF warm up period 504, quick channel information is read at 510 (start of superframe 1) in order to receive shared signaling channel information. Physical frames are read at 520 before an RF shutdown commences at 530.

Figure 6:
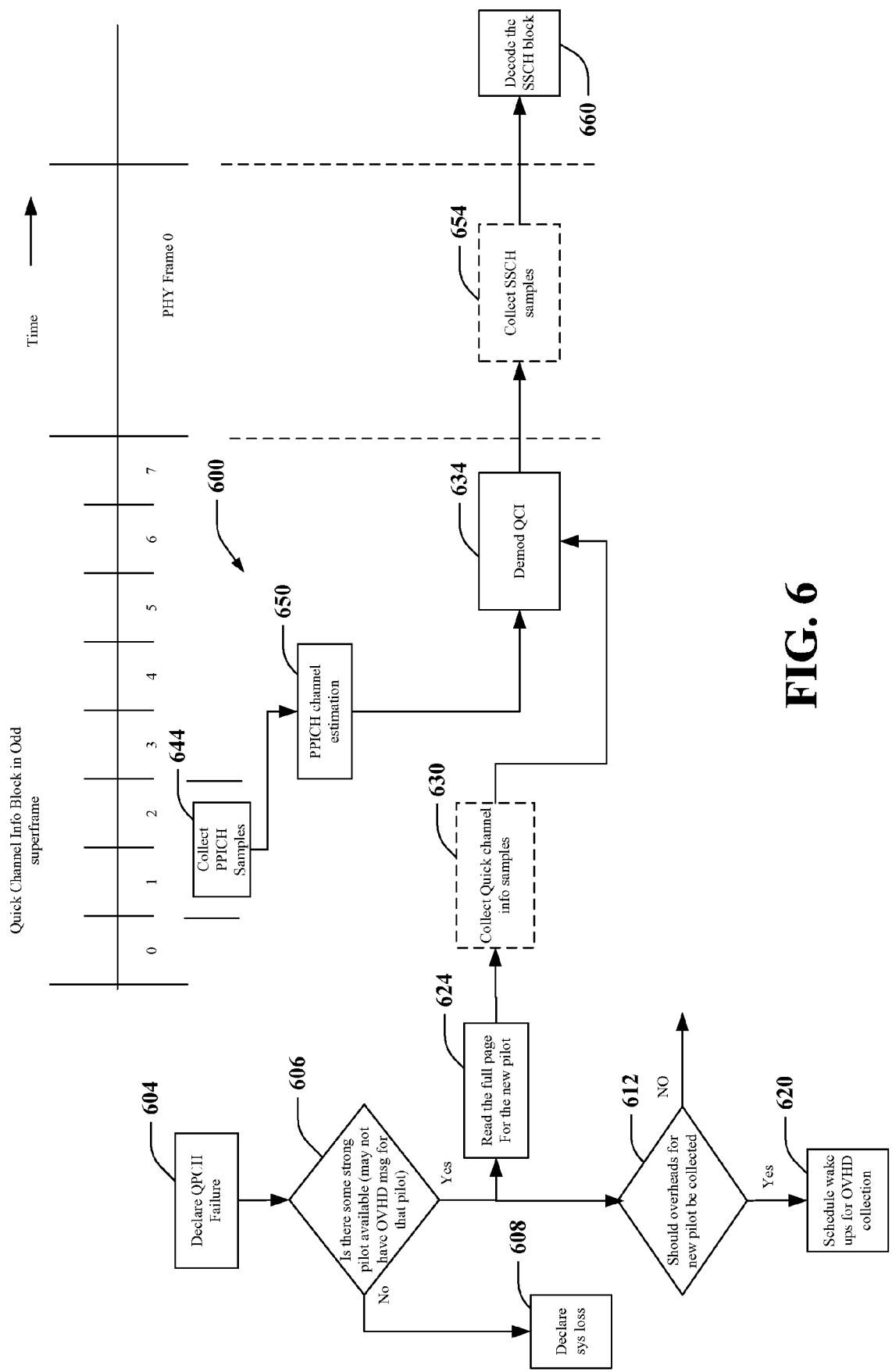
FIG. 6 illustrates a flow diagram for a QPCH decode failure processing.

Proceeding to FIG. 6, a methodology 600 is provided to process a QPCH decode failure. Proceeding to 604, a quick paging channel (QPCH) is declared. At 606, a determination is made as to whether or not a strong pilot signal is available. If not, a system loss is declared at 608 and the process ends. If a strong pilot is available at 606, the process proceeds to 612 where a decision is made as to whether or not overheads should be collected. If not, the process ends or is directed to other processes. If overheads are to be collected at 612, the process proceeds to 620 and schedules access terminal wake ups for overhead message collection.

If the decision at 606 is yes, the process 600 reads a full page of data for the new pilot at 624. At 630, quick channel information samples are collected and the process proceeds to 634 to demodulate quality channel information (QCI). Also feeding 634 are acts 644 to collect preamble pilot channel (PPICH) samples and at 650 to perform a PPICH channel estimation. After the demodulation of the QCI is performed at 634, the process collects shared signaling channel (SSCH) samples at 654 and decodes the SSCH at 660.

Figure 7:
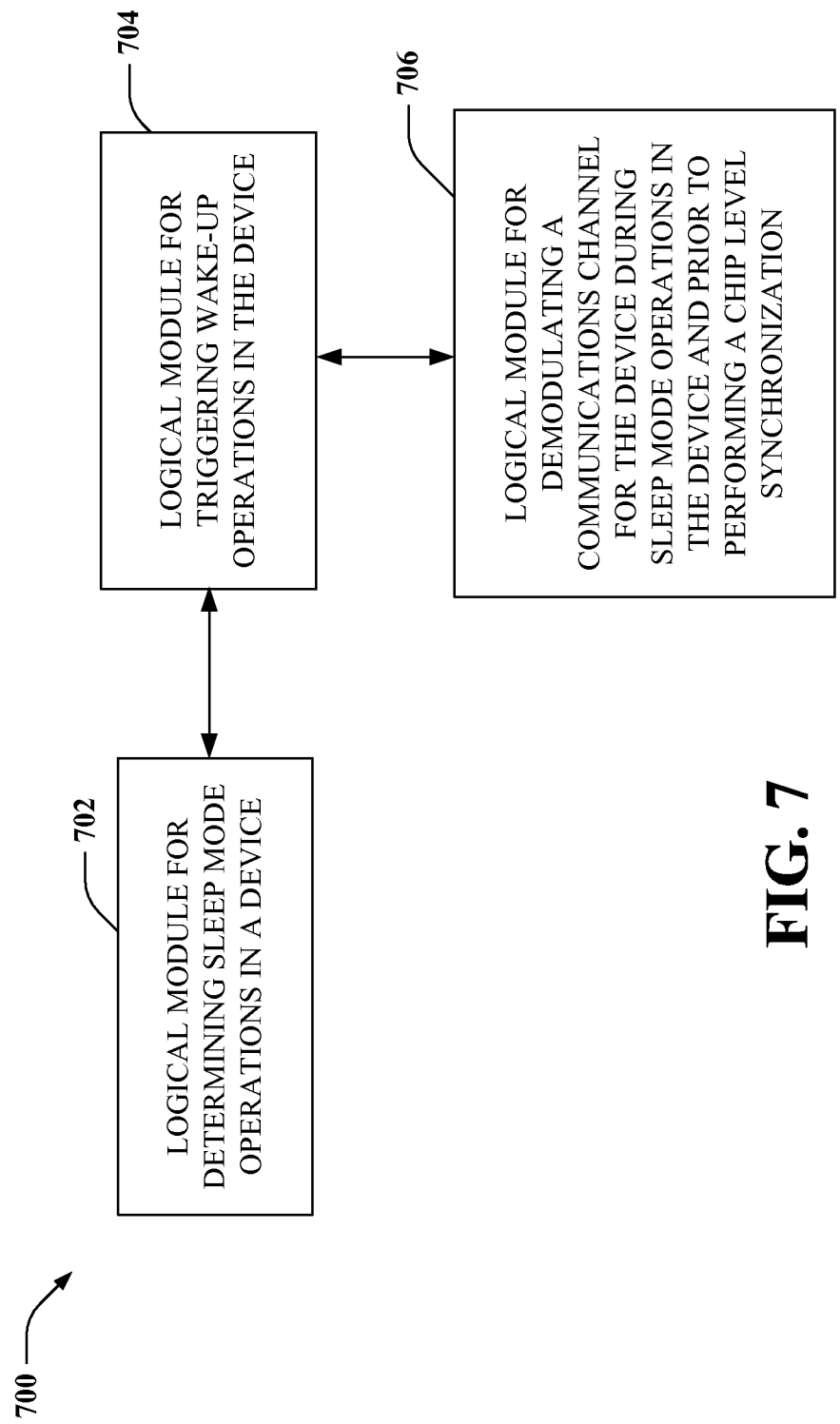
FIGS. 7 and 8 illustrate example logical modules for processing sleep mode operations.
Figure 8:
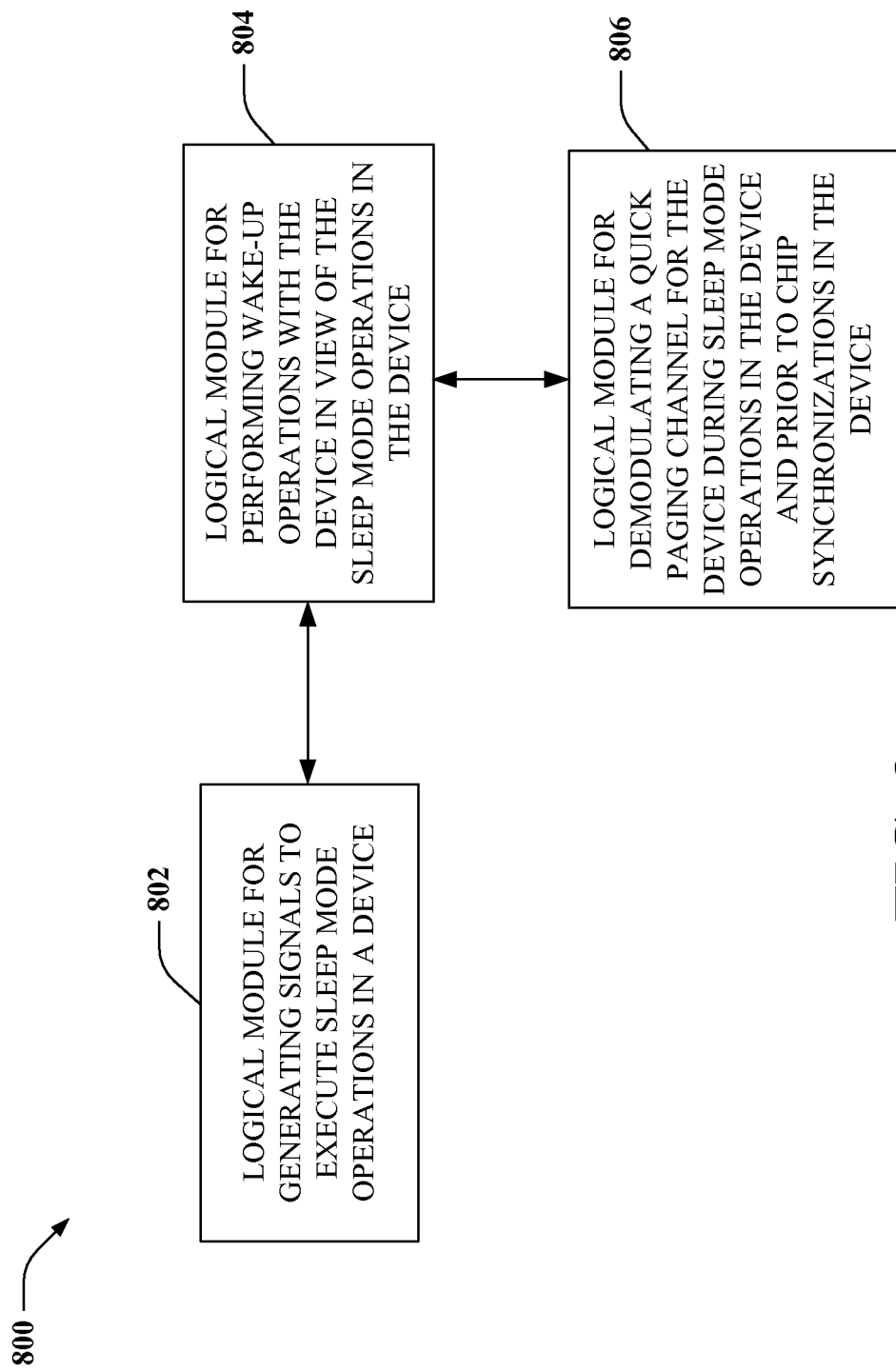

Turning now to FIGS. 7 and 8 collectively, systems are provided that relate to sequence ordering with respect to a terminal, operator networks, access nodes, and traffic flows therewith. The systems are represented as a series of interrelated functional blocks, which can represent functions implemented by a processor, software, hardware, firmware, or any suitable combination thereof.

Referring specifically to FIG. 7, a system 700 that facilitates communications from a mobile device. The system 700 includes a logical module 702 for determining sleep mode operations in a device and a logical module 704 for triggering wake-up operations in the device. This also includes a logical module 706 for demodulating a communications channel for the device during sleep mode operations in the device and prior to performing a chip level synchronization.

Now referring to FIG. 8, a system 800 that facilitates communications from a base station. The system 800 includes a logical module 802 for generating signals to execute sleep mode operations in a device and a logical module 804 for performing wake-up operations with the device in view of the sleep mode operations in the device. The system 800 also includes a logical module 806 for demodulating a quick paging channel for the device during sleep mode operations in the device and prior to chip synchronizations in the device.

Figure 9:
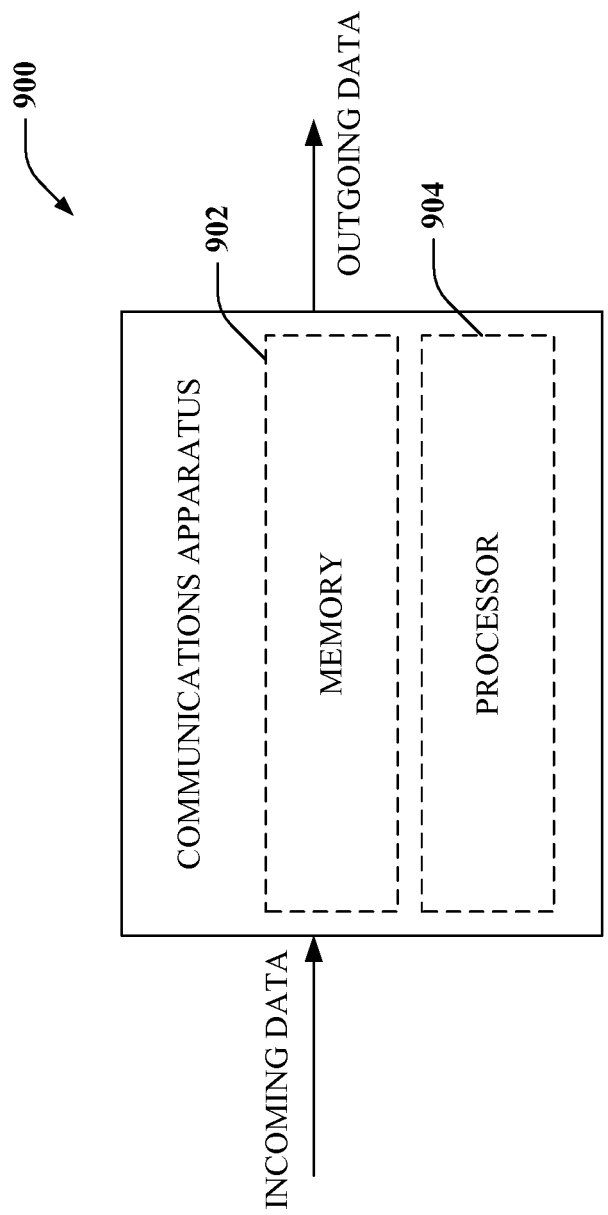
FIG. 9 illustrates an example communications apparatus that employs sleep mode operations.

FIG. 9 illustrates a communications apparatus 900 that can be a wireless communications apparatus, for instance, such as a wireless terminal. Additionally or alternatively, communications apparatus 900 can be resident within a wired network. Communications apparatus 900 can include memory 902 that can retain instructions for switching between sleep mode operations and wake-up operations in a device, the instructions demodulate a communications channel for the device during sleep mode operations in the device and prior to chip level synchronization. Additionally, communications apparatus 900 may include a processor 904 that can execute instructions within memory 902 and/or instructions received from another network device, wherein the instructions can relate to configuring or operating the communications apparatus 900 or a related communications apparatus.

Figure 10:
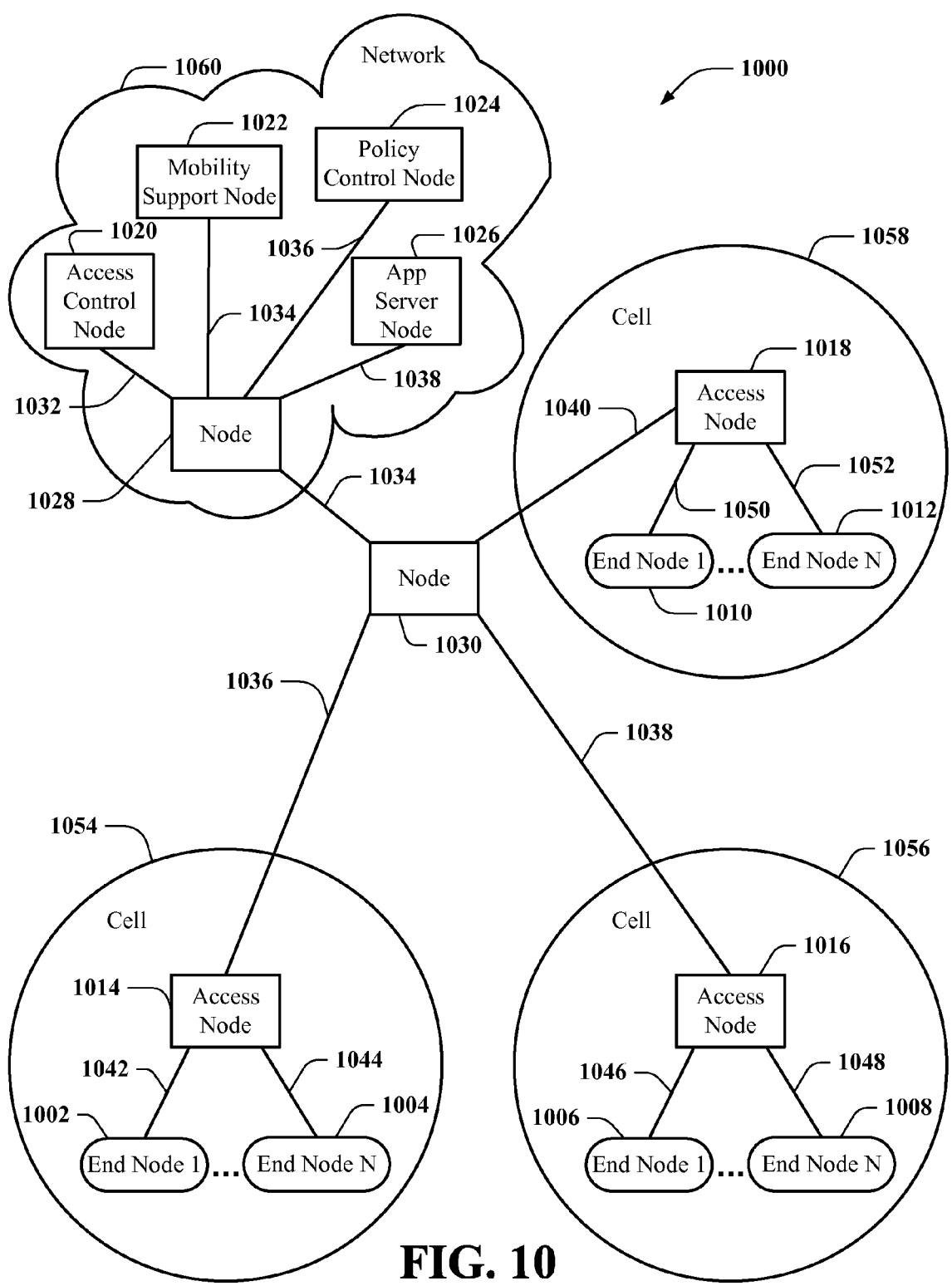
FIG. 10 illustrates an example communications system.

To provide additional context for one or more embodiments described herein, FIG. 10 is provided to illustrate an example communication system 1000 that comprises a plurality of nodes interconnected by communications links. The system 1000 may use Orthogonal Frequency Division Multiplexing (OFDM) signals to communicate information over wireless links. However, other types of signals, e.g., Code Division Multiple Access (CDMA) signals or Time Division Multiple Access (TDMA) signals, are also contemplated (together with signals utilized in land-based networks). Nodes in the communication system 1000 exchange information using signals, e.g. messages, based on communication protocols, e.g., the Internet Protocol (IP). The communications links of the system 1000 may be implemented, for example, using wires, fiber optic cables, and/or wireless communications techniques. The system 1000 includes a plurality of end nodes 1002-1012, which access the communication system 1000 by way of a plurality of access nodes 1014-1018. End nodes 1002-1012 may be, e.g., wireless communication devices or terminals, and the access nodes 1014-1018 may be, e.g., wireless access routers or base stations. Communication system 1000 also includes a number of other nodes 1020-1030 that are used to provide interconnectivity or to provide specific services or functions.

Communications system 1000 depicts a network 1060 that includes access control node 1020, mobility support node 1022, policy control node 1024, and application server node 1026, all of which are connected to an intermediate network node 1028 by a corresponding network link 1032-1038, respectively. In some embodiments, mobility support node 1022, e.g. a Mobile IP home agent and/or context transfer server, supports mobility, e.g., handoff, of end nodes between access nodes, e.g. by way of redirection of traffic to/from end nodes and/or transfer of state associated with end nodes between access nodes. In some embodiments, policy control node 1024, e.g. a policy server or Policy Decision Point (PDP), supports policy authorization for services or application layer sessions. In some embodiments, application server node 1026, e.g., a Session Initiation Protocol server, streaming media server, or other application layer server, supports session signaling for services available to end nodes and/or provides services or content available to end nodes.

Intermediate network node 1028 in network 1060 provides interconnectivity to network nodes that are external from the perspective of network 1060 by way of network link 1034. Network link 1034 is connected to intermediate network node 1030, which provides further connectivity to access nodes 1014, 1016, and 1018 by way of network links 1036-1040, respectively. Each access node 1014-1018 is depicted as providing connectivity to end nodes 1002-1012, respectively, by way of corresponding access links 1042-1052, respectively. In communication system 1000, each access node 1014-1018 is depicted as using wireless technology, e.g. wireless access links, to provide access. Wired technology may also be utilized, however, in connection with provision of access. A radio coverage area, e.g., communications cells 1054-1058 of each access node 1014-1018, is illustrated as a circle surrounding the corresponding access node.

Figure 11:
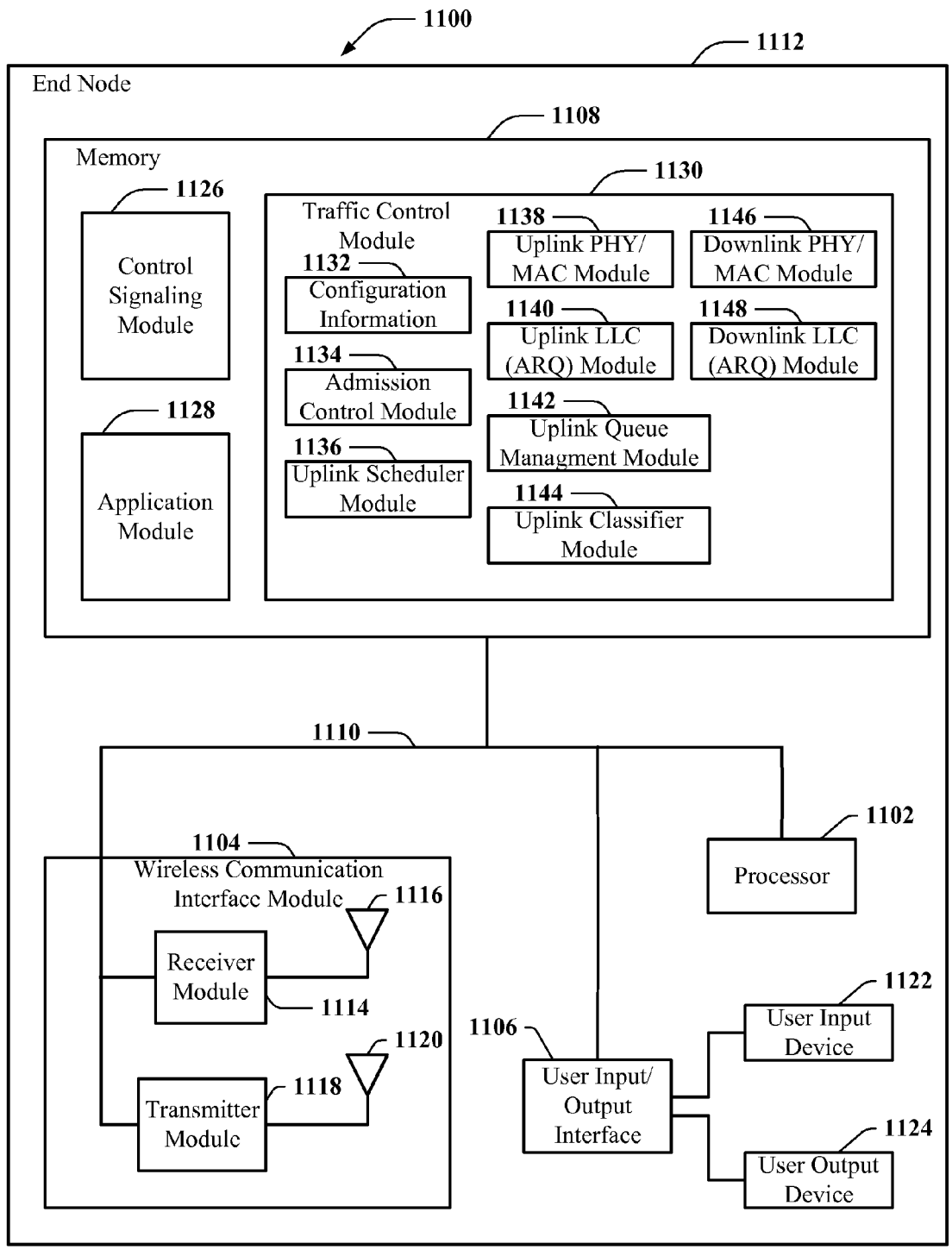
FIG. 11 illustrates an example end node.

FIG. 11 provides an illustration of an example end node 1100, e.g. wireless terminal. End node 1100 is a representation of an apparatus that may be used as any one of end nodes 1002-1012 (FIG. 10). End node 1100 includes a processor 1102, a wireless communication interface module 1104, a user input/output interface 1106 and memory 1108 coupled together by a bus 1110. Accordingly, by way of bus 1110, the various components of the end node 1100 can exchange information, signals and data. Components 1102-1108 of end node 1100 can be located inside a housing 1112.

Wireless communication interface module 1104 provides a mechanism by which the internal components of end node 1100 can send and receive signals to/from external devices and network nodes, e.g. access nodes. Wireless communication interface module 1104 includes, e.g., a receiver module 1114 with a corresponding receiving antenna 1116 and a transmitter module 1118 with a corresponding transmitting antenna 1120 used for coupling end node 1100 to other network nodes, e.g. by way of wireless communications channels.

End node 1100 also includes a user input device 1122, e.g. keypad, and a user output device 1124, e.g. display, which are coupled to bus 1110 through user input/output interface 1106. Thus, user input/output devices 1122 and 1124 can exchange information, signals and data with other components of end node 1100 by way of user input/output interface 1106 and bus 1110. User input/output interface 1106 and associated devices 1122 and 1124 provide mechanisms by which a user can operate end node 1100 to accomplish various tasks. In particular, user input device 1122 and user output device 1124 provide functionality that allows a user to control end node 1100 and applications, e.g., modules, programs, routines and/or functions, that execute in memory 1108 of end node 1100.

Processor 1102, under control of various modules, e.g., routines, included in memory 1108 controls operation of end node 1100 to perform various signaling and processing. The modules included in memory 1108 are executed on startup or as called by other modules. Modules may exchange data, information, and signals when executed. Modules may also share data and information when executed. Memory 1108 of end node 1100 includes a control signaling module 1126, an application module 1128, and a traffic control module 1130, which further includes configuration information 1132 and various additional modules.

An uplink scheduler module 1136 controls processing relating to transmission scheduling, e.g. order and/or timing, and allocation of transmission resources, e.g., information coding rate, transmission time slots, and/or transmission power, for data information, e.g., messages, packets, and/or frames, to be sent by way of wireless communication interface module 1104, e.g. from end node 1100 to an access node. Uplink scheduler module 1136 can schedule transmissions and allocate transmission resources as a function of QoS parameters associated with one or more traffic flows. In some embodiments, scheduling and/or resource allocation operations performed by uplink scheduler module 1136 are additionally a function of channel conditions and other factors, e.g., power budget.

An uplink PHY/MAC module 1138 controls physical (PHY) layer and Media Access Control (MAC) layer processing relating to sending data information, e.g. messages, packets, and/or frames, by way of wireless communication interface module 1104, e.g., from end node 1100 to an access node. An uplink LLC (ARQ) module 1140 controls Logical Link Control (LLC) layer processing relating to sending data information, e.g., messages, packets, and/or frames, through wireless communication interface module 1104, e.g., from end node 1100 to an access node. Uplink LLC (ARQ) module 1140 includes processing associated with Automatic Repeat Request (ARQ) capabilities, e.g., retransmission of lost packets or frames.

An uplink queue management module 1142 maintains information and controls processing relating to storage of data information to be sent by way of wireless communication interface module 1104, e.g., from end node 1100 to an access node. An uplink classifier module 1144 controls processing relating to identification of data information as belonging to particular traffic flows prior to being sent by way of the wireless communication interface module 1104, e.g. from end node 1100 to an access node. A downlink PHY/MAC module 1146 controls PHY layer and MAC layer processing relating to receiving data information by way of wireless communication interface module 1104. A downlink LLC (ARQ) module 1148 controls LLC layer processing relating to receiving data information by way of wireless communication interface module 1104.

Figure 12:
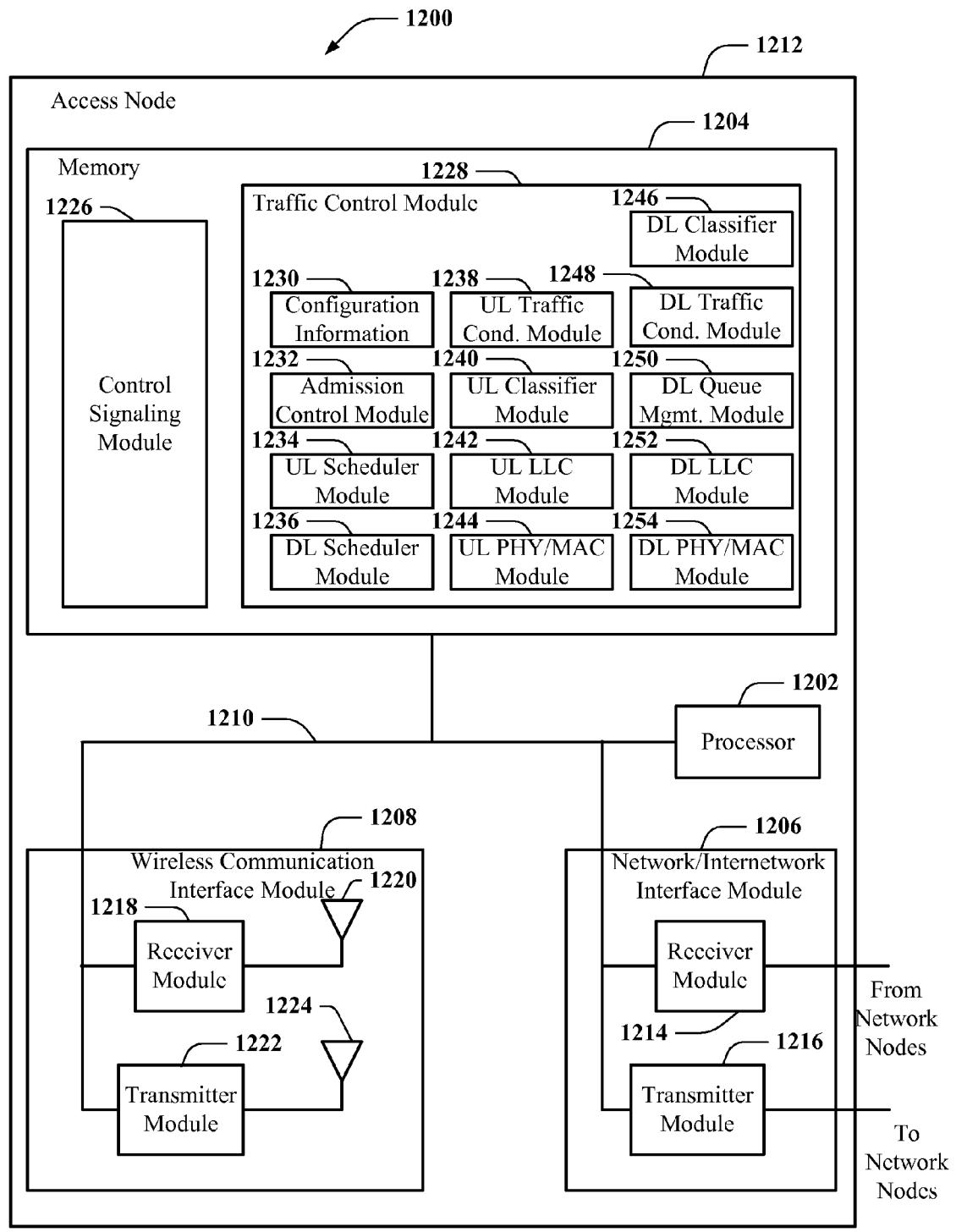
FIG. 12 illustrates an example access node.

FIG. 12 provides a detailed illustration of an example access node 1200 implemented in accordance with the present invention. The access node 1200 is a detailed representation of an apparatus that may be used as any one of the access nodes 1014-1018 depicted in FIG. 10. In the FIG. 12 embodiment, access node 1200 includes a processor 1202, memory 1204, a network/internetwork interface module 1206 and a wireless communication interface module 1208, coupled together by bus 12 10. Accordingly, by way of bus 1210 the various components of access node 1200 can exchange information, signals and data. The components 1202-1210 of access node 1200 are located inside a housing 1212.

Network/internetwork interface module 1206 provides a mechanism by which the internal components of access node 1200 can send and receive signals to/from external devices and network nodes. Network/internetwork interface module 1206 includes a receiver module 1214 and a transmitter module 1216 used for coupling node 1200 to other network nodes, e.g. through copper wires or fiber optic lines. Wireless communication interface module 1208 also provides a mechanism by which the internal components of access node 1200 can send and receive signals to/from external devices and network nodes, e.g. end nodes. Wireless communication interface module 1208 includes, e.g., a receiver module 1218 with a corresponding receiving antenna 1220 and a transmitter module 1222 with a corresponding transmitting antenna 1224. Wireless communication interface module 1208 is used for coupling access node 1200 to other nodes, e.g., by way of wireless communication channels.

Processor 1202 under control of various modules, e.g. routines, included in memory 1204 controls operation of access node 1200 to perform various signaling and processing. The modules included in memory 1204 are executed on startup or as called by other modules. Modules may exchange data, information, and signals when executed. Modules may also share data and information when executed. In the FIG. 12 embodiment, memory 1204 of access node 1200 includes a control signaling module 1226 and a traffic control module 1228, which further includes configuration information 1230 and various additional modules 1232-1254.

Figure 13:
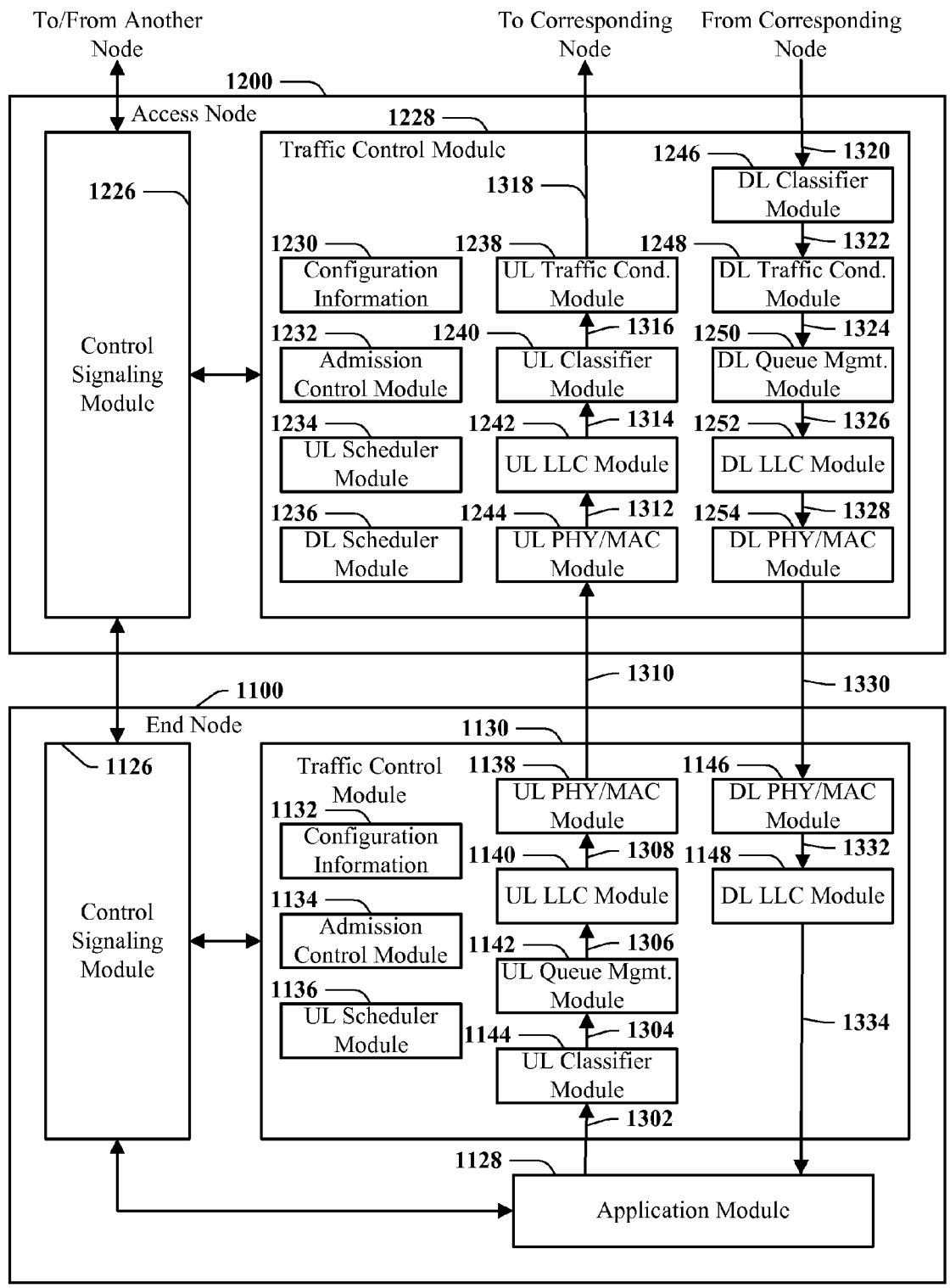
FIG. 13 illustrates an example end node communicating with an example access node.

FIG. 13 illustrates example signaling and traffic flows between various modules included in example end node 1100 and example access node 1200. The FIG. 13 end node 1100 and FIG. 13 access node 1200 are simplified representations of the FIG. 11 end node 1100 and FIG. 12 access node 1200, respectively. The FIG. 13 example shows application module 1128 sending and receiving data information, e.g. traffic flows comprising a sequence of messages, packets, or frames.

In the context of the FIG. 10 example system, the FIG. 13 end node 1100 may be any one of end nodes 1002-1012 depicted in FIG. 10 and the application module 1128 included in the FIG. 13 end node 1100 may be exchanging data information with another node in the system, e.g., another end node 1002-1012 or the application server node 1026 as depicted in FIG. 10. In FIG. 13 and the subsequent description, the node with which the FIG. 13 end node 1100 is exchanging data information is referred to as the corresponding node.

The data information, e.g. traffic flows comprising a sequence of messages, packets, or frames, sent from the application module 1128 in the end node 1100 to a corresponding node is shown by a sequence of arrows 1302-1308 to proceed through a sequence of modules 1138-1144 included in end node 1100 for processing, after which the data information is sent from the end node 1100 to the access node 1200, e.g. by way of wireless communication interface module 1104. Following reception by access node 1200, e.g., by way of wireless communication interface module 1208, the data information, e.g., traffic flows comprising a sequence of messages, packets, or frames, sent from the application module 1128 in end node 1100 to the corresponding node is shown by a sequence of arrows 1310-1318 to proceed through a sequence of modules 1238-1244 included in access node 1200 for processing, prior to being forwarded from the access node 1200 toward the corresponding node, e.g., directed in accordance with routing information to an intermediate node connected to the access node by way of network/internetwork interface module 1206.

The data information, e.g. traffic flows comprising a sequence of messages, packets, or frames, sent from a corresponding node to application module 1128 in end node 1128 is shown by a sequence of arrows 1320-1328 to be received by access node 1200, e.g., by way of network/internetwork interface module 1206, and then to proceed through a sequence of modules 1246-1254 included in access node 1200 for processing, after which the data information is sent from the access node 1200 to the end node 1100, e.g., via the wireless communication interface module 1208. Following reception by end node 1100, e.g. by way of wireless communication interface module 1104, the data information, e.g., traffic flows comprising a sequence of messages, packets, or frames, sent from the corresponding node to application module 1128 in end node 1100 is shown by a sequence of arrows 1330-1334 to proceed through a sequence of modules 1146 and 1148 included in end node 1100 for processing, prior to being delivered to the application module 1128 in end node 1100.

In addition to the exchange of data information, e.g. traffic flows, FIG. 13 also depicts the exchange of control information, e.g., signaling flows and/or communication interfaces. In particular, the FIG. 13 example depicts the exchange of control information between control signaling module 1226 and traffic control module 1228 included in access node 1200. Similarly, the FIG. 13 example depicts the exchange of control information between control signaling module 1126 and the traffic control module 1130 included in the end node 1100. In both access node 1200 and end node 1100, exchange of control information between the modules as shown allows the respective control signaling module 1226/1126 in the access/end node 1200/1100 to affect, e.g., set, modify, and/or monitor, the configuration and/or operation of the various modules included in the respective traffic control module 1228/1130, as needed to provide the proper quality of service treatment of the data information, e.g., traffic flows, to/from the application module 1128 in the end node 1100.

The exchange of control information, e.g. signaling flows and/or communication interfaces, is also shown a) between another node and control signaling module 1226 in access node 1200, b) between application module 1128 in end node 1100 and control signaling module 1126 in end node 1100, and c) between the respective control signaling modules 1226/1126 in access node 1200 and end node 1100. These exchanges of control information, e.g. signaling flows and/or communication interfaces, enable the configuration and/or operation of traffic control modules 1228/1130 in both access node 1200 and the end node 1100 to be affected by a) one or more additional nodes, e.g. the access control node 1020 and/or application server node 1026, b) application module 1128 in end node 1100, or c) a combination of one or more additional nodes and the application module 1128 in end node 1100. Various embodiments of the present invention may, and do, support all or only a subset of the depicted control information exchanges as needed.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A communications method for a wireless mobile device, comprising:
performing sleep mode operations in a device;
performing wake-up operations with one or more base stations in view of the sleep mode operations in the device;
demodulating a communications channel for the device during the sleep mode operations in the device prior to synchronizing with the one or more base stations and based on at least one prior wake-up operation; and
demodulating a paging channel signal employing at least one of a sector in a previous wake-up slot and a strongest sector observed via acquisition.

2. The method of claim 1, further comprising synchronizing with the one or more base stations in parallel to demodulating the communications channel for the device.

3. The method of claim 1, further comprising switching between wake mode operations of the device and sleep mode operations.

4. The method of claim 3, further comprising employing an internal signal or an external signal to switch between wake mode operations and sleep mode operations.

5. The method of claim 1, further comprising processing one or more paging channel signals during sleep mode operations.

6. The method of claim 5, further comprising processing one or more acquisition channel signals during wake mode operations.

7. The method of claim 6, further comprising employing the acquisition channel signals for chip level synchronization.

8. The method of claim 1, further comprising employing at least one other subsequent sector observed via acquisition to demodulate a paging channel signal.

9. The method of claim 1, further comprising processing superframe preamble samples after a warm up period that begins a wake operation.

10. The method of claim 9, further comprising performing a radio frequency shutdown operation after processing the superframe preamble samples.

11. The method of claim 1, further comprising collecting preamble pilot channel samples.

12. The method of claim 11, further comprising performing a channel estimation on the preamble pilot channel samples.

13. The method of claim 12, further comprising performing a cyclic redundancy check or a quick page match during wake mode operations.

14. A communications apparatus, comprising:
a memory that retains instructions for switching between sleep mode operations and wake-up operations in a device, wherein the instructions are configured to demodulate a communications channel for the device during sleep mode operations in the device prior to chip level synchronization and based on at least one prior wake-up operation, and to demodulate a paging channel signal employing at least one of a sector in a previous wake-up slot and a strongest sector observed via acquisition; and
a processor that executes the instructions.

15. The communications apparatus of claim 14, further comprising a synchronization component to facilitate synchronization with one or more base stations.

16. The communications apparatus of claim 15, further comprising a component to process one or more acquisition channel signals.

17. The communications apparatus of claim 16, the acquisition channel signals are processed during wake mode operations of a device.

18. A communications apparatus, comprising:
means for determining sleep mode operations in a device;
means for triggering wake-up operations in the device;
means for demodulating a communications channel for the device during sleep mode operations in the device prior to performing a chip level synchronization and based on at least one prior wake-up operation; and
means for demodulating a paging channel signal employing at least one of a sector in a previous wake-up slot and a strongest sector observed via acquisition.

19. A non-transitory machine-readable medium having stored thereon machine-executable instructions for:
executing sleep mode operations in a device;
demodulating paging channel signals for the device during sleep mode operations in the device prior to synchronizing with one or more base stations and based on at least one prior wake-up operation, wherein demodulating the paging channel signals employs at least one of a sector in a previous wake-up slot and a strongest sector observed via acquisition.

20. The machine-readable medium of claim 19, further comprising demodulating the paging channel signals concurrently with synchronizing with the one or more base stations.

21. The machine-readable medium of claim 19, further comprising executing at least one channel estimation.

22. A processor that executes the following instructions:
executing sleep mode operations in a device;
performing wake-up operations with one or more base stations in view of the sleep mode operations in the device;
demodulating a paging channel for the device during sleep mode operations in the device prior to synchronizing with the one or more base stations and based on at least one prior wake-up operation; and
demodulating a paging channel signal employing at least one of a sector in a previous wake-up slot and a strongest sector observed via acquisition.

23. A communications apparatus, comprising:
means for generating signals to execute sleep mode operations in a device;
means for performing wake-up operations with the device in view of the sleep mode operations in the device; and
means for demodulating a paging channel for the device during sleep mode operations in the device prior to chip synchronizations in the device and based on at least one prior wake-up operation, wherein the means for demodulating the paging channel employs at least one of a sector in a previous wake-up slot and a strongest sector observed via acquisition.

24. The communications apparatus of claim 14, wherein the instructions are configured to employ a sector in a previous wake-up slot to demodulate the communications channel.

25. The communications apparatus of claim 24, wherein the instructions are further configured to employ a strongest sector observed via acquisition to demodulate the communications channel.

26. The communications apparatus of claim 25, wherein the instructions are further configured to employ at least one other subsequent sector observed via acquisition to demodulate the communications channel.

27. The communications apparatus of claim 18, further comprising means for employing a sector in a previous wake-up slot to demodulate the communications channel.

28. The communications apparatus of claim 27, further comprising means for employing a strongest sector observed via acquisition to demodulate the communications channel.

29. The communications apparatus of claim 28, wherein the instructions are further configured to employ at least one other subsequent sector observed via acquisition to demodulate the communications channel.

30. The non-transitory machine-readable medium of claim 19, wherein the instructions are further for:
employing a sector in a previous wake-up slot to demodulate the communications channel.

31. The non-transitory machine-readable medium of claim 30, wherein the instructions are further for:
employing a strongest sector observed via acquisition to demodulate the communications channel.

32. The non-transitory machine-readable medium of claim 31, wherein the instructions are further for:
employing at least one other subsequent sector observed via acquisition to demodulate the communications channel.

33. The processor of claim 22, wherein the processor further executes the following instructions:
employing a sector in a previous wake-up slot to demodulate the communications channel.

34. The processor of claim 33, wherein the processor further executes the following instructions:
employing a strongest sector observed via acquisition to demodulate the communications channel.

35. The processor of claim 34, wherein the processor further executes the following instructions:
employing at least one other subsequent sector observed via acquisition to demodulate the communications channel.

36. The communications apparatus of claim 23, further comprising means for employing a sector in a previous wake-up slot to demodulate the communications channel.

37. The communications apparatus of claim 36, further comprising means for employing a strongest sector observed via acquisition to demodulate the communications channel.

38. The communications apparatus of claim of claim 37, wherein the instructions are further configured to employ at least one other subsequent sector observed via acquisition to demodulate the communications channel.

* * * * *